Jan. 16, 1945. F. W. MILLER Re 22,590

BOILER CONDITIONING APPARATUS

Original Filed Sept. 30, 1937

INVENTOR.
Frank W. Miller
BY
Chas. J. Wilson
Atty.

Reissued Jan. 16, 1945

Re. 22,590

UNITED STATES PATENT OFFICE 22,590

BOILER CONDITIONING APPARATUS

Frank W. Miller, Chicago, Ill., assignor to Franclare Company, Chicago, Ill., a corporation of Illinois Original No. 2,224,605, dated December 10, 1940, Serial No. 300,330, October 20, 1939, which is a division of Serial No. 166,509, September 30, 1937. Application for reissue May 4, 1942, Serial No. 441,626

3 Claims. (Cl. 261—76)

Figure 1:
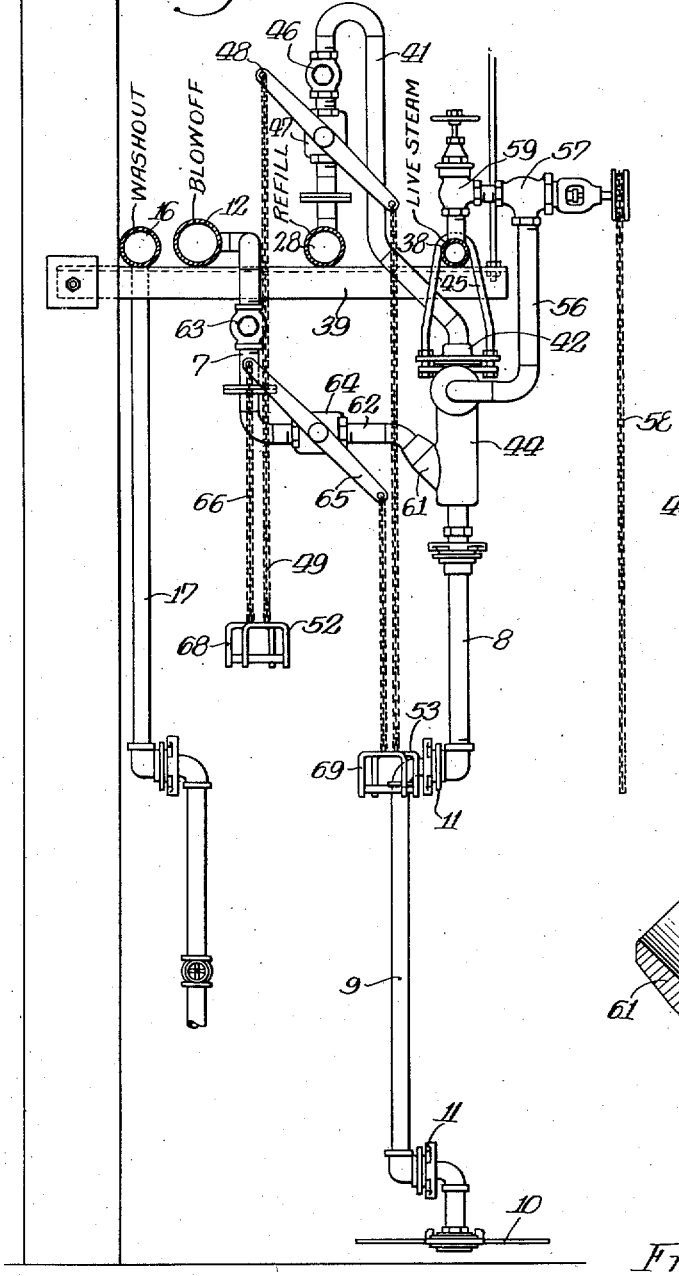

This invention relates to the conditioning of steam boilers generally by wholly or partially blowing off the contaminated fluid contents of the boiler and replacing the same with clean, fresh water. While the invention is adapted for use in connection with boilers of the stationary type, it is particularly advantageous in the reconditioning of locomotive boilers, because it enables such boilers to be reconditioned or replenished with steam and water to produce or maintain in the boiler sufficient steaming pressure to make the locomotive self-propelling. This application is a division of my application Serial No. 166,509, filed September 30, 1937, now Patent No. 2,260,857, issued October 28, 1941.

One of the primary purposes of my present invention is to provide an apparatus of the character indicated which will be capable of increasing the temperature of the refill water approximately 50° F. by the admixture and entrainment of steam in such water and without the production of any appreciable water hammer.

In accordance with my invention, the water under high pressure is employed as the propulsive force and is delivered from a nozzle into the throat of a Venturi tube embodied in a so-called "heat booster," while the steam under a lower pressure than the water is drawn in large quantities into the stream at the low pressure area in the throat of the venturi with the result that steam heat units in large volume are added to the water to raise its temperature well above the boiling point so that in practice the water is delivered to the boiler at a steaming temperature of 235° F. or more. In this manner, the boiler can be quickly refilled with water to the desired water level at which time a substantial steam pressure will have been created in the boiler. If such pressure be insufficient for the self-propulsion of the locomotive, the water may be cut off when the appropriate water level in the boiler has been reached, and steam alone may thereafter be admitted until the desired boiler pressure has been reached.

For the purpose of facilitating an understanding of the principles of my invention, I have illustrated on the accompanying drawing a preferred embodiment thereof, although it should be understood that the invention is capable of embodiment in apparatus both for locomotive and stationary boilers in structural assemblies differing substantially from the present illustrative disclosure. Referring to the drawing, Fig. 1 is a fragmentary elevation partially in section of one of the servicing units located adjacent a round house stall, and Fig. 2 is a vertical sectional view through the heat booster shown in Fig. 1.

Referring to the drawing more in detail, the apparatus comprises a blow-off line 12 through which blow-off products from the locomotive boiler are delivered for conservation in the usual manner, a washout line 16 to which washout water is delivered from any suitable source and from which it is delivered through a drop 17 and a washout nozzle (not shown) to the interior of the boiler for washout purposes, a refill line 28 which is supplied with refill water by a high pressure pump adapted to deliver the water under a pressure of 120 or more pounds, and a live steam line 38 connected with any suitable steam source, the various lines and the connected apparatus being supported upon a bracket 39 or other suitable support. The steam pressure in line 38 is maintained substantially below the water pressure in the refill line 28 by a pressure regulator of standard construction (not shown), all as fully described in my parent application above identified.

Figure 2:
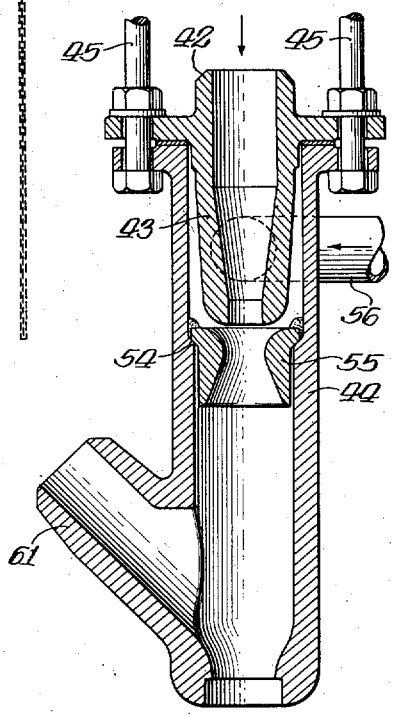

Referring now more particularly to Fig. 1 wherein the washout, blow-off, refill and live steam lines are shown in section, it will be observed that each of these lines is connected with the main drop 8 of the service unit in a manner which will be explained. The drop 8 is adapted to be put in communication with the interior of the boiler shell 10 by intervening flexible connections including the pipe 9 and swivel joints 10. The refill line 28 is connected through a riser 41, preferably of inverted U shape with the upper end 42 of a nozzle 43 projecting into the upper end of casing 44 of the heat booster and secured to the casing by bolts 45 which also serve as a hanger for the booster. One leg of the riser is equipped with a check valve 46 adapted to prevent reverse flow into the refill line and with a shut-off valve 47 provided with an operating lever 48 which may be actuated from the floor through the medium of drop chains 49 and 51 equipped with hand grips 52 and 53 respectively.

The booster casing 44 is of elongated cylindrical shape provided with an internal shoulder 54 upon which a flanged Venturi tube 55 is seated in alignment with and slightly spaced from the end of the nozzle 43, the bore of which, as will be apparent from Fig. 3, is tapered.

The live steam line 38 is connected with the interior of the casing 44 in proximity to the nozzle 43 and ahead of the venturi 55, through a pipe 56 which is equipped with a hand shut-off valve 57 operable from the floor through chains 58 and with an adjustable regulating valve 59, which may be manually set to deliver at any predetermined rate of flow.

The casing 44 is also provided with a lateral branch 61 which is connected through a pipe 62 to the blow-off line 12, this pipe being provided with a check valve 63 to prevent reverse flow from blow-off line 12 to the booster and with a shut-off valve 64 provided with an operating lever 65 which may be actuated from the floor through the chains 66 and 67 equipped respectively with the hand grips 68 and 69.

The apparatus functions substantially as follows:

Assuming that the conduit 9 is connected with the boiler to be blown off, valves 47 and 57 are closed, and valve 64 is opened to permit the boiler contents to be wholly or partially blown off through the blow-off line 12. If partial blow-off of contaminated water and replacement thereof by fresh water is contemplated while maintaining the boiler under steam pressure, valve 64 is closed and valves 47 and 57 are opened after a predetermined quantity of the contaminated water has been blown off. Thereupon water under pressure in excess of the boiler pressure is delivered from the refill line 28 through the nozzle 43 and venturi 55, and steam under a lower pressure is delivered from the steam line 38 into the booster 44 around nozzle 43 from pipe 56.

As the water under higher pressure than the steam is discharged by the nozzle through the venturi, its velocity is increased and its static pressure is decreased at the throat of the venturi so that the steam surrounding the nozzle is injected into and entrained in the water in large quantities, thereby raising the temperature of the water from around 200° to 240° to 250° so that the water when delivered into the boiler is considerably above steaming temperature.

When the blown-off contaminated water has been replaced by an equal quantity of fresh water, thereby restoring the water level in the boiler, valves 47 and 57 are closed and valve 64 is opened permitting another partial blow-off. The alternate partial blowing off and replacement of the blown-off water with fresh water is continued until the boiler contains the desired amount of water and of a condition suitable for further continued operation of the boiler.

If a complete blowing off, washout and refilling operation is to be performed, valve 64 remains open while valves 47 and 57 remain closed until the entire contents of the boiler have been blown off. Thereupon, the boiler may be washed out by water delivered from the drop 17 in the usual manner and then refilled with clean fresh water from the refill line 28 heated to above steaming temperature before delivery into the boiler by steam at lower pressure from the line 38.

During a reconditioning operation, whether the boiler be repeatedly partially blown down and refilled or whether it be completely blown down, washed out and refilled, the temperature of the refill water is raised in the heat booster without the production of objectionable water hammer and more steam is entrained with the water, thereby producing a greater increase in water temperature than has heretofore, so far as I am aware, been produced. The elimination of the water hammer is attributable to using the water as the propulsive force in the booster and delivering this water at a substantially higher pressure than the pressure of the heating steam, which enters the chamber around the nozzle at a lower pressure than the water and is drawn in large quantities into the water stream by the temporary reduction in pressure in the throat of the venturi which enables the steam to enter the venturi and become thoroughly mingled with and entrained in the water as the stream reassumes its normal pressure and velocity upon expansion beyond the venturi.

With a system embodying my invention it is not unusual with the valves fully open to replenish a locomotive boiler at a speed of from three hundred to six hundred gallons of water per minute at a temperature of 250° or more.

With either method of reconditioning, if the steam pressure in the boiler at the conclusion of the reconditioning operation is insufficient for self-propulsion of the locomotive, the valve 47 may be closed when the desired water level in the boiler has been attained and the valve 57 left open to thereby supply additional steam to the boiler until a self-propelling pressure has been established therein.

It is believed that my invention and many of its attendant advantages will be understood and appreciated from the foregoing, and it should be manifest that the structural details shown and described for illustrative purposes may be varied within wide limits within the scope of my invention as defined in the following claims.

I claim:

1. A boiler conditioning apparatus comprising a cylindrical casing provided with an internal, annular shoulder, a Venturi tube seated on said shoulder, a nozzle projecting into the upper end of the casing into cooperative relation to said venturi, means for securing said nozzle in position, means for supplying water under pressure to said nozzle, means for supplying steam under a lower pressure than the water to the casing in the vicinity of the mouth of the venturi, a conduit of smaller diameter than the casing connected to the lower end of the casing and adapted for connection with a boiler shell, said casing providing a chamber between the delivery end of the venturi and said pipe of greater cross sectional area than that of the stream of water entering the chamber through said venturi, and means for controlling the delivery of said steam and water to said casing.

2. A boiler conditioning apparatus comprising a cylindrical casing provided with an internal, annular shoulder, a Venturi tube seated on said shoulder, a nozzle projecting into the upper end of the casing into cooperative relation to said venturi, means for securing said nozzle in position, means for supplying water under pressure to said nozzle, means for supplying steam under a lower pressure than the water to the casing in the vicinity of the mouth of the venturi, a conduit of smaller diameter than the casing connected to the lower end of the casing and adapted for connection with a boiler shell, said casing providing a chamber between the delivery end of the venturi and said pipe of greater cross sectional area than that of the stream of water entering the chamber through said venturi, and a branch conduit leading from said chamber through which boiler blowoff products delivered to the chamber by the conduit connected to the boiler shell are discharged.

3. A boiler conditioning apparatus comprising a cylindrical casing having a Venturi tube disposed therein in spaced relation to the upper end thereof, a nozzle projecting into said upper end of said casing in alignment with and into proximity to the mouth of said venturi, said nozzle being externally tapered to provide a surrounding chamber above the venturi of increasing cross-sectional area toward the venturi, means for securing said nozzle in position, means for supplying water under pressure to said nozzle, means for supplying steam under a lower pressure than the water to the tapered chamber surrounding said nozzle above the venturi, a conduit of smaller diameter than the casing connected to the lower end of the casing and adapted for connection with a boiler shell, said casing providing a chamber between the delivery end of the venturi and said pipe of greater cross-sectional area than that of the stream of water entering the chamber through said venturi, and means for controlling the delivery of said steam and water to said casing.

FRANK W. MILLER.